Oct. 25, 1966 W. H. KONKEL 3,280,593

COOLING DEVICE

Filed March 19, 1965

INVENTOR.
WALTER H. KONKEL,
BY
Robert Thompson
ATTORNEY.

3,280,593
COOLING DEVICE

Walter H. Konkel, Santa Barbara, Calif., assignor to Santa Barbara Research Center, Goleta, Calif., a corporation of California Filed Mar. 19, 1965, Ser. No. 441,240
4 Claims. (Cl. 62—514)

Figure 1:
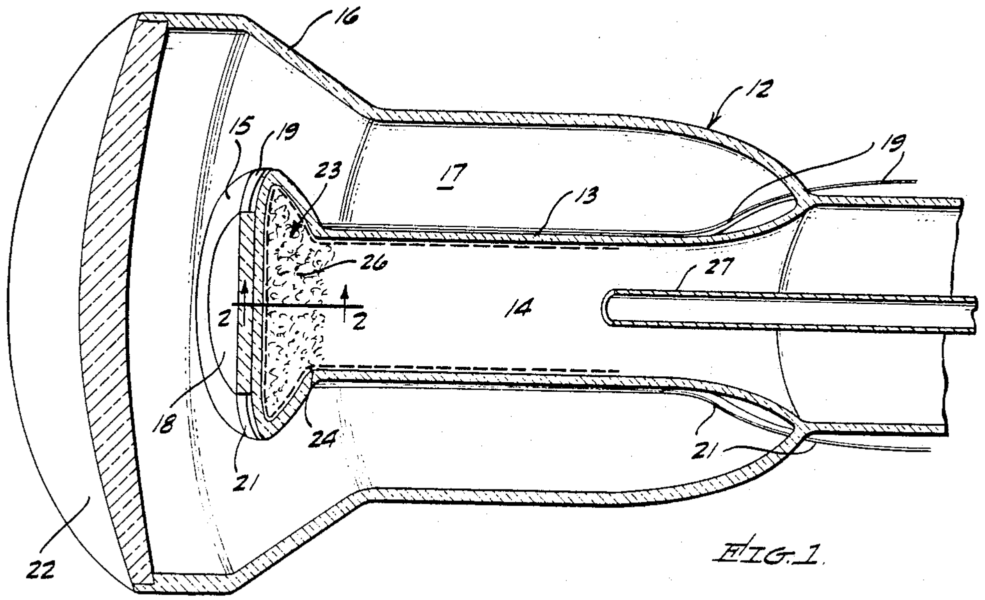

This invention relates generally to an improvement in thermal transfer from a liquid cryogen to a heat load and relates more particularly to an improved dewar for cooling an electronic device.

It has been found that substantial improvements in the operating characteristics of certain electronic devices, such as infrared detectors, can be achieved by cooling the device to cryogenic temperatures. One way that this cooling could be achieved would be to use a dewar having a cooling finger with reentrant chamber formed therein. A heat load or electronic device could be secured to the bottom of the cooling finger in thermal contact with the reentrant chamber. To cool the electronic device, a cryogen, such as liquid nitrogen, could be continually supplied to the reentrant chamber and the available refrigeration would be transferred to the electronic device. As the liquid cryogen gives up its available refrigeration, it would boil off and be vented or exhausted back through the mouth of the reentrant chamber. Several dewars of this type are described and illustrated in U.S. Patents 3,052,861, granted to G. O. Hayball et al., and 3,103,585, granted to T. H. Johnson et al.

An object of this invention is to provide a means for improving the heat transfer from liquid cryogen to a heat load in the above type of dewar.

Another object of this invention is to provide a means for continually cooling a heat load under a variety of environmental conditions including zero gravity conditions.

Another object of this invention is to provide a means for providing rapid and efficient cooling of a heat load in a dewar of the above-described type.

The above and other objectives of this invention can be achieved by providing a dewar having: a cooling finger with a reentrant chamber formed therein; and a hollow jacket surrounding the cooling finger with an annular space between the housing and the cooling finger being evacuated to provide thermal insulation. Secured in thermal contact with the convex surface of the cooling finger tip is a heat load such as an infrared detector, electronic device, etc. The concave surface of the cooling finger is coated with a layer of silver or other efficient thermal conductor that does not readily oxidize, or chemically react in a cryogen atmosphere. A wad of silver shavings or silver wool is inserted in the cooling finger and is tamped or otherwise forced into conformity with the contour of the tip of the cooling finger. The silver coating is fired at an elevated temperature, bonding the silver coating to the silver shavings and to the cooling finger. For cooling the heat load a liquid cryogen is continually supplied to the reentrant chamber so that the available refrigeration of the cryogen is transferred to the silver shavings through the silver coating and thence to the heat load for continually cooling thereof.

Figure 2:
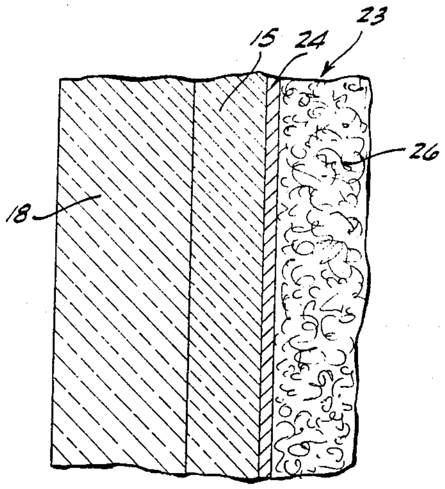

Other objects, features and advantages of this invention will become apparent upon reading the following detailed description and referring to the accompanying drawing illustrating one embodiment in which:

FIG. 1 is a cross-sectional, perspective view of a dewar including the improved heat transfer means contained therein; and FIG. 2 is an enlarged cross-sectional view of the improved heat transfer means taken along the line 2—2 of FIG. 1.

Referring now to the drawings, there is illustrated in FIG. 1 a dewar 12. The dewar 12 includes a cooling finger 13 having a reentrant chamber 14 and a flared flattened finger tip 15. Surrounding the cooling finger 13 is a hollow jacket 16 which is bonded with the cooling finger at the mouth thereof. An annular space 17, formed between the cooling finger 13 and the jacket 16, is evacuated to provide thermal insulation therebetween. A suitable material for the cooling finger 13 is a glass, such as Corning Glass 7520. The jacket 16 is also made of a suitable glass, such as Pyrex 7740.

A heat load 18 is secured in thermal contact with the convex surface of the flat finger tip 15 by means of any appropriate thermal cement. It should be understood that the heat load can be an infrared detector, an electronic device, etc. In the case of electronic devices, electrical energy is supplied to the heat load 18 by means of a pair of electrical conductors 19 and 21 that extend through the wall of the dewar 12 along the convex surface of the cooling finger 13 into electrical contact with the heat load 18.

In those cases where the heat load 18 is an optically-sensitive device, such as an infrared detector, a portion of the outer jacket 16 adjacent the heat load 18 is formed with a window 22. The window 22 is capable of transmitting radiation within an appropriate spectrum to the heat load (infrared detector) 18.

A heat transfer mechanism 23 is mounted within the reentrant chamber 14 at the finger tip 15 and provides a heat transfer path to the heat load 18. The heat transfer mechanism includes a layer of efficient heat-conducting material 24, coating the concave surface of the finger tip 15, especially in the wall area of the heat load 18. Bonded to the heat conductor layer 23 is a wad of efficient heat-conducting and liquid cryogen entrapping material such as shavings 26 that is shaped to conform to the surface contour of the finger tip 15. In a preferred embodiment, the heat-conducting material used for the layer 24 and for the shavings 26 is silver. Of course it should be understood that other efficient heat conductors that do not react or oxidize readily, such as gold, platinum, silver, etc. can also be used.

The heat load 18 is cooled by means of a liquid cryogen supplied to the heat transfer mechanism 23. The liquid cryogen is continually supplied or injected into the heat transfer mechanism 23 by means of a supply tube 27 mounted to extend into the reentrant chamber 14 along the axis thereof. One way that the liquid cryogen is supplied with sufficient force to reach the heat transfer mechanism 23 is by a Leidenfrost transfer technique, described in U.S. Patent 2,996,893, issued to J. G. Goodenough et al. The injected cryogen droplets are projected axially through the reentrant chamber 14 to strike the shavings 26 and are entrapped therein. The cryogen droplets use their available refrigeration to cool the heat load 18 in the following manner. Heat from the heat load 18 is transferred through the glass wall of the finger tip 15, through the layer of heat-conducting material 24, and along the heat-conducting shavings 26. As the cryogen absorbs heat, it boils off and forms a gas, whereupon the gaseous cryogen is evacuated back through the reentrant chamber 14 and out the mouth thereof. One liquid cryogen that could be used would be nitrogen.

There are numerous advantages to the above-described heat exchange mechanism 23. First of all, the shavings 26 entrap the liquid cryogen for all gravitational conditions from zero gravity to a gravity vector orientation along any of the orthogonal axes. In other words, the heat load 18 will be continually cooled even if the gravitational force vector is oriented along the dewar axis against the direction of the injected cryogen droplets.

Another advantage of this heat transfer mechanism is that the initial cool-down time is greatly reduced since the effects of a cryogen-gas, boundary-layer created by the initial cryogen boil-off does not seriously affect the heat transfer to the liquid cryogen. In other words, the solid material of the heat-conduction shavings 26 provide the heat transfer path between the heat load 18 and the liquid cryogen entrapped within the shavings 26. For example, in one device that has been constructed, the initial cool-down time has been reduced from 20 seconds without the heat transfer mechanism to 4 seconds with the heat transfer mechanism 23. Still another advantage of the heat transfer mechanism is that the temperature gradient across the detector mounting area is quite uniform, thereby enabling cooling of a large width heat load 18.

The above-described device can be manufactured by coating the concave surface reentrant chamber 14 in the vicinity of the finger tip 15 with a layer of silver paint 24. Thereafter, the wad of silver shavings 26 is inserted into the reentrant chamber 14 and tamped or otherwise forced into conformity with the contour of the flared finger tip 15.

Referring back to the layer of silver paint 24, there are several types of paint that could be used. One type is an air-dried silver paint made by the Du Pont Company, number 4817 and described in Electro Chemicals Bulletin, Ceramic Products CP 18–1161. As the name implies, the air dries this type of paint, whereupon, the silver shavings 26 are adhered in or bonded within the layer and the layer is adhered to or bonded to the concave surface of the finger tip 15. Another type of silver paint that could be used is a liquid mixture including silver particles and glass frit particles and made by the Du Pont Company, number 7713, described in Electro Chemicals Bulletin, Ceramic Products CP 2–361. With this second type of paint applied, the cooling finger 13 is fired to a temperature between 450° and 500° C. to melt the glass frit. The melting of the glass frit forms a substantial silver layer 24 that bonds or adheres the silver shavings into it and bonds or adheres to the glass at the finger tip 15.

The size of silver shavings 26 could fall within a wide range of sizes or diameters. For practical purposes, however, the diameter used in the devices constructed ranges from 0.03 inch down to very fine sizes.

With the heat transfer mechanism 23 assembled in the above-described manner, the heat load 18 is secured to the flat convex surface of the finger tip 15 with a suitable fastening material. The electrical conductors 19 and 21 are secured along the convex surface of the cooling finger 13 by any suitable fastening material and are connected to the heat load 18. The cooling finger 13 and the outer jacket 16 are secured together at their mouth portions by any suitable glass-blowing technique. In addition, the electrical conductors 19 and 21 are secured through the intersection of the secured mouths to form a gas-tight glass-to-metal seal. The above-described manufacturing steps for the dewar are well known in the manufacturing art, as indicated by the previously-referenced U.S. Patents 3,052,861 and 3,103,585.

While salient features have been illustrated and described with respect to a particular embodiment, it should be readily apparent that modifications can be made within the spirit and scope of the invention, and it is therefore not desired to limit the invention to the exact details shown and described.

What is claimed is:

1. A cooling device comprising a hollow cooling finger having a heat load secured to an outer surface thereof,
means operable to deliver liquid cryogen to the cooling finger,
and a film of thermally heat conducting material adhering to the inner surface of said finger.

2. A cooling device according to claim 1,
wherein said heat-conducting material includes a thermally conductive mat bonded to the coating film and extending into the cavity formed by the hollow finger.

3. A cooling device according to claim 2,
wherein said mat is bonded to said film immediately adjacent said outer surface,
said mat comprising metallic shavings projecting into the hollow finger to entrap liquid cryogen,
said film covering a major portion of said inner surface,
and an outer container surrounding said finger and defining a vacuum space therebetween.

4. A method of manufacturing a cryogenic Dewar having an outer shell, and a hollow cooling finger disposed within the outer shell with a vacuum space therebetween,
the steps of coating the inner surface of said hollow finger with a highly thermally conductive material,
positioning a mat of thermally conductive material in a segment of said hollow finger in immediate adjacency to a heat load mounting surface,
and bonding the mat to said thermally conductive film.

References Cited by the Examiner

UNITED STATES PATENTS

| | | | |
|---|---|---|---|
| 2,892,250 | 6/1959 | Bartels | 62—514 |
| 2,973,434 | 2/1961 | Roberts | 62—514 |
| 3,006,157 | 10/1961 | Haettinger et al. | 62—514 |
| 3,016,716 | 1/1962 | Walker | 62—514 |
| 3,066,222 | 12/1962 | Poorman et al. | 62—514 |
| 3,188,824 | 6/1965 | Geist et al. | 62—514 |

ROBERT A. O'LEARY, *Primary Examiner.*

LLOYD L. KING, *Examiner.*